United States Patent [19]

Bergdahl et al.

[11] 4,198,668

[45] Apr. 15, 1980

[54] HIGH-VOLTAGE DIRECT CURRENT INTERUPTION DEVICES

[75] Inventors: Bernt Bergdahl; Erik Borg, both of Ludvika, Sweden

[73] Assignee: Asea Aktiebolag, Vesteras, Sweden

[21] Appl. No.: 945,788

[22] Filed: Sep. 25, 1978

[30] Foreign Application Priority Data

Sep. 26, 1977 [SE] Sweden ............ 7710729

[51] Int. Cl.[2] ............ H02H 7/22; H01H 33/59

[52] U.S. Cl. ............ 361/8; 361/9; 361/13; 361/58

[58] Field of Search ............ 361/8, 9, 13, 11, 16, 361/58

[56] References Cited

U.S. PATENT DOCUMENTS

| | | | |
|---|---|---|---|
| 2,862,152 | 11/1958 | Rydén | 361/16 |
| 2,878,428 | 3/1959 | Böckman et al. | 361/16 |
| 3,198,986 | 8/1965 | Luehring et al. | 361/13 X |
| 3,522,472 | 8/1970 | Breitholtz | 361/58 X |
| 3,809,959 | 5/1974 | Pucher | 361/8 |
| 4,028,592 | 6/1977 | Fahlen et al. | 361/16 |

*Primary Examiner*—Harry E. Moose, Jr.
*Attorney, Agent, or Firm*—Watson, Cole, Grindle & Watson

[57] ABSTRACT a spark gap device in a high-voltage direct current interrupting device maintains a substantially constant ignition voltage by constructing the.spark gap device in at least two series-connected main spark gaps connected in parallel with a voltage divider for distributing the voltage across the main spark gaps. An ignition voltage-determining auxiliary gap is connected in series with an impedance connected in parallel with one or more of the main spark gaps to effect a continued ignition thereof. The ignition voltage of the high-voltage direct current interrupting device is determined by the auxiliary gap such that the auxiliary gap is not subjected to appreciable wear whereby the variations of the ignition voltage are relatively small and not influenced by the wear of the main spark gaps.

9 Claims, 2 Drawing Figures

HIGH-VOLTAGE DIRECT CURRENT INTERUPTION DEVICES

BACKGROUND OF THE INVENTION

1. Field of the Invention

The present invention relates to high-voltage direct current interrupting devices, and particularly to such devices of the type comprising a commutating circuit-breaker with two parallel branches, one branch consisting of a series connection of a capacitor and a spark gap device, and the second branch consists of a surge diverter arranged to control the current and interrupt it upon opening of the commutating circuit-breaker.

2. Prior Art

High-voltage direct current interruption devices of the above-mentioned type are known, for example, as described in U.S. Pat. No. 3,809,959, wherein the spark gap connected to the capacitor is severely worn because of the high currents passing through the spark gap during the breaking operations. This causes the spark gap ignition voltage to vary within relatively wide limits, and such variations of the ignition voltage must be taken into consideration when dimensioning the commutating circuit-breaker and the capacitor so that a safe current commutation to the capacitor branch is obtained both at the lowest and the highest ignition voltage that may occur. Those considerations increase the costs and the size of the capacitor and the commutating circuit-breaker.

SUMMARY OF THE INVENTION

The primary purpose of the present invention is to provide, in a high voltage direct current interrupting means of the type described herein, a spark gap device for maintaining a practically constant ignition voltage, which is achieved by constructing the spark gap member in at least two series-connected main spark gaps connected in parallel with a voltage divider to distribute the voltage across the main spark gaps. An ignition voltage-determining auxiliary gap is in series with an impedance connected in parallel with one or more of the main spark gaps for effecting a continued ignition thereof. In such a device, in which the ignition voltage is determined by an auxiliary gap which is not subjected to any mentionable wear, the variations of the ignition voltage are relatively small and are not influenced by the wear on the main spark gaps.

It has been proposed to use as overvoltage protection a main surge diverter consisting of several series-connected partial spark gaps, the ignition of the diverter being initiated by a precision spark gap connected in a parallel branch as described in U.S. Pat. No. 2,878,428. The present invention is a further development of that principle for the purpose of providing a connection suitable for high-voltage direct current interrupting devices.

BRIEF DESCRIPTION OF THE DRAWINGS

The above features, advantages and objects are apparent from the following description taken in conjunction with the accompanying drawing.

DETAILED DESCRIPTION

Figure 1:
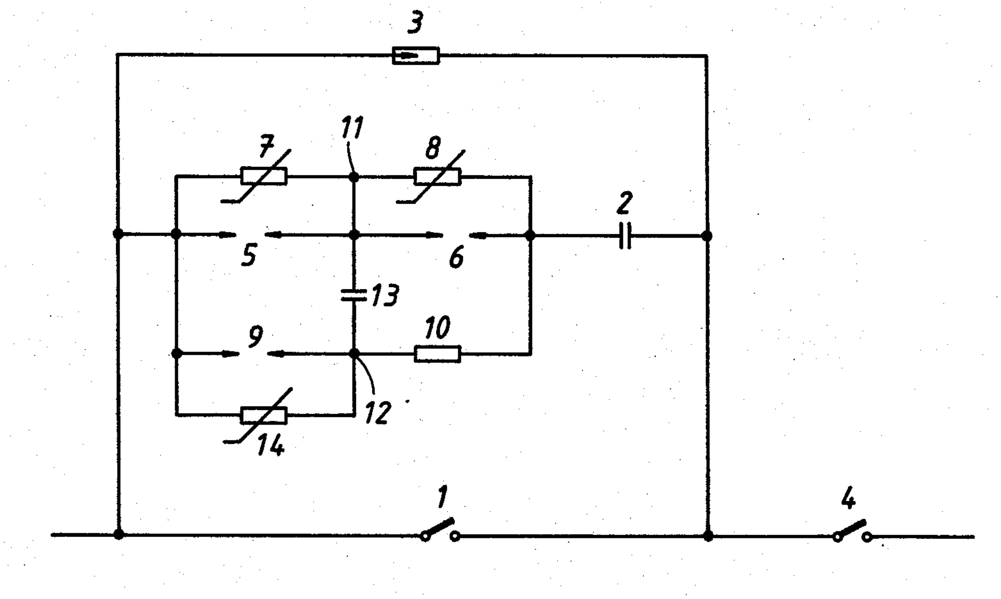
FIG. 1 shows a circuit diagram of a high-voltage direct current interrupting device according to the invention.

With respect to FIG. 1, commutating circuit-breaker 1 consists of a conventional minimum oil circuit-breaker of the same design used in AC networks. In parallel with circuit-breaker 1 is a commutating circuit consisting of capacitor 2 connected in series with series-connected spark gaps 5 and 6. In another branch parallel to circuit-breaker 1 there is surge diverter 3 functioning as an energy absorber, residual current circuit-breaker and overvoltage protector. Complete electrical insulation across the interrupting device in the off-position is achieved by high-speed operated disconnecting switch 4.

The two series-connected main spark gaps 5 and 6 are connected in parallel with linear or non-linear voltage control resistors 7 and 8. Spark gaps 5 and 6 are preferably designed for the same ignition voltage, in which case resistors 7 and 8 are also of equal resistance. In another branch parallel to main spark gaps 5 and 6, auxiliary gap 9 is connected in series with resistor 10. From the junction 11 between spark gaps 5, 6 to junction 12 between auxiliary gap 9 and series resistor 10, there is connected a cross-connection capacitor 13. In parallel with auxiliary gap 9, voltage-dependent resistor 14 is connected for achieving voltage control across the auxiliary spark gap.

Both main spark gaps 5, 6 and auxiliary spark gap 9 may individually consist of several series-connected spark gap units, for example designed in the form of plates capable of being stacked on top of each other, and of the type used in surge diverters. Resistors 7, 8 and 14 are then made in a corresponding number of units and are provided with voltage-controlling cross-connections between the respective resistors and the associated spark gap stack.

Main spark gaps 5 and 6 have a total ignition voltage exceeding the ignition voltage of auxiliary spark gap 9, but their individual ignition voltage is lower than that of gap 9. Each of main spark gaps 5 and 6 may, for example, consist of two series-connected spark gap units, whereas auxiliary spark gap 9 may consist of three series-connected spark gap units with the same ignition voltage.

During a breaking operation, circuit-breaker 1 is opened and then generates an arc voltage which, when it has reached a certain value, ignites auxiliary spark gap 9. Almost the entire arc voltage is then applied across resistor 10. Soon after the arc ignition of gap 9, the potential at junction 11 changes to the same extent as the potential at junction 12, since the voltage across capacitor 13 cannot be changed suddenly. Almost the entire arc voltage is thus applied across main spark gap 6 whereby that gap is immediately ignited, and thereafter an arc across main spark gap 5 is also ignited. Main spark gaps 5 and 6 now carry all the current and the arc across auxiliary spark gap 9 is extinguished.

Through the arc ignition of spark gaps 5 and 6, the line current is rapidly transmitted to capacitor 2, the arc in circuit-breaker 1 thus being extinguished. When the voltage across capacitor 2 has reached the ignition level for surge diverter 3, it is ignited, controls the current and reduces it towards zero in a controlled manner, i.e. interrupts the current without giving rise to unallowable overvoltages. When the current is interrupted, disconnecting switch 4 is opened to insulate the circuit.

Surge diverter 3 consists of a number of resistors, preferably of a voltage-dependent type, connected in series with a number of series-connected self-extinguishing spark gaps. A sufficient energy-absorbing capability is achieved by constructing the diverter with several parallel branches and arranging trigger impedances therebetween in such a manner that a substantially simultaneous ignition of the parallel diverter branches is obtained. In that way the diverter branches divide the discharging current and the discharging energy between them. Surge diverters of this type with the required breaking capacity are available on the market.

Figure 2:
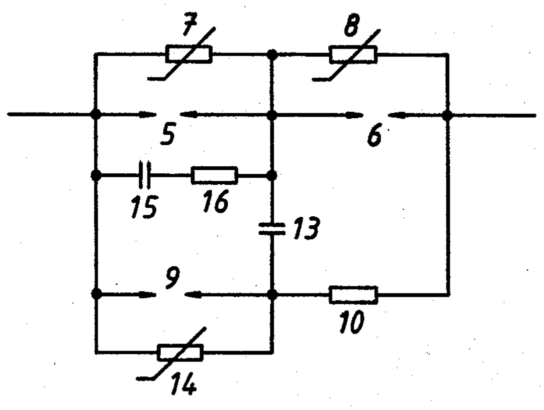
FIG. 2 shows a modified embodiment of the spark gap device included in the high-voltage direct current interrupting means.

FIG. 2 shows a modified embodiment of the spark gap arrangement of FIG. 1. In addition to the components included in the spark gap means according to FIG. 1, the means according to FIG. 2 also includes a series-connection of capacitor 15 and resistor 16 arranged in parallel with spark gap 5. Capacitor 15 and resistor 16 suitably have the same respective values as capacitor 13 and resistor 10. This results in a symmetrization of the means so that an even distribution of the voltage across the spark gaps is also achieved in the case of rapid transient voltages.

In a spark gap means of the described design, the ignition voltage of the high voltage direct current interrupter is not influenced by the wear on main spark gaps 5 and 6, but is completely determined by auxiliary spark gap 9. Since auxiliary spark gap 9 is not subjected to any appreciable wear, the variations of the ignition voltages are relatively small. These variations may be further reduced by providing auxiliary gap 9 with means for keeping it alive and arranging it in a hermetically sealed casing filled with dry nitrogen gas. Since the ignition voltage can be kept substantially constant, the other components in the interrupting device can be dimensioned in an optimum manner from a technical-economical point of view.

What is claimed is:

1. High-voltage direct current interrupting device comprising a commutating circuit-breaker with two parallel branches, one of said branches including a series connection of a capacitor and spark gap means, and the second of said branches includes a surge diverter for controlling the current and interrupting it upon opening of said commutating circuit-breaker, said spark gap means comprising at least two series-connected main spark gaps and a voltage divider connected in parallel therewith, said voltage divider distributing the voltage across said at least two main spark gaps, an ignition voltage-determining auxiliary spark gap and an impedance connected in series therewith are connected in parallel with at least one of said at least two main spark gaps for effecting a continued ignition thereof.

2. High-voltage direct current interrupting device according to claim 1, wherein the series-connected auxiliary spark gap and impedance are connected in parallel with said at least two series-connected main spark gaps, and further comprising a second capacitor connected between the junction between said at least two main spark gaps and the junction between said auxiliary gap and said impedance.

3. High-voltage direct current interrupting device according to claims 1 or 2, further comprising a voltage-dependent resistor, and said auxiliary gap is connected in parallel therewith.

4. High-voltage direct current interrupting device according to claim 2, wherein the ignition voltage of said auxiliary gap is lower than the total ignition voltage of said at least two main spark gaps but is higher than the ignition voltage for each individual main spark gap.

5. High-voltage direct current interrupting device according to claim 2, further comprising a second capacitor and a resistor connected in series therewith, said second capacitor and resistor are connected in parallel with one of said at least two main spark gaps such that a uniform voltage distribution across said at least two main spark gaps is obtained for rapid transient voltages.

6. High-voltage direct current interrupting device according to claim 3, wherein the ignition voltage of said auxiliary gap is lower than the total ignition voltage of said at least two main spark gaps but is higher than the ignition voltage for each individual main spark gap.

7. High-voltage direct current interrupting device according to claim 2, further comprising a second capacitor and a resistor connected in series therewith, said second capacitor and resistor are connected in parallel with one of said at least two main spark gaps such that a uniform voltage distribution across said at least two main spark gaps is obtained for rapid transient voltages.

8. High-voltage direct current interrupting device according to claim 3, further comprising a second capacitor and a resistor connected in series therewith, said second capacitor and resistor are connected in parallel with one of said at least two main spark gaps such that a uniform is obtained for rapid transient voltages.

9. High-voltage direct current interrupting device according to claim 6, further comprising a second capacitor and a resistor connected in series therewith, said second capacitor and resistor are connected in parallel with one of said at least two main spark gaps such that a uniform voltage distribution across said at least two main spark gaps is obtained for rapid transient voltages.

* * * * *